UNITED STATES PATENT OFFICE.

JOSEPH KLAR, OF SHELBYVILLE, ILLINOIS.

IMPROVEMENT IN HOG-TRAPS.

Specification forming part of Letters Patent No. 159,185, dated January 26, 1875; application filed June 26, 1874.

*To all whom it may concern:*

Be it known that I, JOSEPH KLAR, of Shelbyville, in the county of Shelby and State of Illinois, have invented certain new and useful Improvements in Hog-Traps; and I do hereby declare that the following is a full, clear, and exact description thereof, which will enable others skilled in the art to which it pertains to make and use the same, reference being had to the accompanying drawings and to the letters of reference marked thereon, which form a part of this specification.

The object of my invention is to provide a trap for catching, throwing, and holding animals for any desired purpose; and consists in the arrangement and combination of levers, slides, and other mechanism herein set forth.

In the drawings, Figure 1 is a side elevation, and Fig. 2 is a plan view, of my invention.

The frame A of my invention is constituted of the sill A′, posts B and C, cross-timbers D and E, and brace F, tenoned or otherwise securely fastened together. The frame, when set for use, is secured firmly in position by means of stakes or bolts passing through mortises or clevises provided at the ends of the sill A, and by braces attached to the posts B and C, and extending outward, their ends resting on the floor or ground to which they are secured by any suitable means. The cross-timber D extends some length beyond the post C. It is provided with the long mortise $a$ and the pulley $a^1$, journaled in a mortise at the end. Attached to the side, by the pivot $a^2$, is the ratch $a^3$, which is held pressed into a horizontal mortise cut for its reception, and communicating with the mortise $a$ by the spring $a^4$. $a^5$ is a cord for raising the ratch $a^3$. It is attached to the handle of said ratch and passes around the pulley $a^1$. G is a horizonal slide for catching the neck of the animal against the post B. It moves in grooves provided in the sill A and cross-timber E, and has secured to its under edge friction-rollers to facilitate its movements. Secured to it is the block $i$, in which are two friction-rollers, $i'$, placed slightly apart, as indicated in dotted lines in Fig. 1. H is a perpendicular slide, which moves in grooves provided in the posts B and C, and is used in connection with the slide G and other mechanism, hereafter shown, for throwing the animal on its side and for holding it there. $b$ is a block in which are secured two friction-rollers, $b'$, between which the end of the lever, which operates the slide H, moves. These rollers are indicated by dotted lines, Fig. 1. I is a lever for operating the slide G. It passes through the mortise $a$ and is journaled at $i^2$ in a mortise in the cross-timber E. Its lower end extends to and works between the rollers $i^1$. Its upper end is provided with the rod $c$, by which it is operated. It is held at any desired point in its movements backward or forward by the ratch $a^3$. J is a lever for operating the perpendicular slide H. It is journaled to the slide at $o$. Its end works between the rollers $b^1$, and in its operations can be fixed at any point by the ratch $b^2$ attached to the post C. K is a horizontal frame attached to the sill A. It rests on the ground or floor, and is attached to the sill by the hooked staples or hinges $e$, so that it can be easily removed when not in use. L is a sliding platform or table resting and moving on the frame K. On its under side are secured two guide-strips, one of which moves against the sill A, and the other against the outer bar of the frame K. On it the animal is thrown and held when undergoing any operation. M are two curved handles or levers, so hinged to the side of the platform L that they can be turned up over said platform. By them the platform is moved forward or backward, and by them the animal may be held firmly on said platform.

This trap is so constructed that it can be used at the door of a sty, at a gap in the fence, or at a gateway. The slide G being thrown back from the post B, and the slide H raised, the animal, as it passes through the opening thus made, is caught by the neck by pulling the rod $c$ and drawing the lever I toward the operator, which action closes the slide against the post B, securing the animal as in a vise. The slide H is now pressed down against the neck of the animal and the platform L against its feet. By gradually releasing the gripe of the slide G, which is done by pulling on the cord $a^5$, so as to raise the ratch $a^3$, and by pushing on the rod $c$, which forces back the lever I, and at the same time continue pressing down the slide H, and also forcing the platform L under, the animal is turned on its side on the platform L and its neck against the sill A, where it is held by the levers M, which are turned up over the side and pressed upon by the attendant and by the slide H, which is held by the lever J, which again is secured by the ratch $b^2$.

This device can be employed for the purpose of securing and throwing larger size animals than hogs, by constructing it of such dimensions as may be suited to the particular class desired to be handled.

Having described my invention, what I claim, and desire to secure by Letters Patent, is—

The slides H and G and moving platform L, with their several arms, levers, and ratchets, substantially as and for the purposes specified.

In testimony that I claim the foregoing as my own I hereby affix my signature in presence of two witnesses.

JOSEPH KLAR.

Witnesses:
  D. W. JACOBY,
  W. L. HAYDON.